US010791505B2

(12) United States Patent
Kim et al.

(10) Patent No.: US 10,791,505 B2
(45) Date of Patent: Sep. 29, 2020

(54) SERVER PROVIDING LIST OF WIRELESS HOT-SPOTS FOR MOBILE TERMINAL AND CONTROL METHOD THEREFOR

(71) Applicant: Samsung Electronics Co., Ltd., Suwon-si, Gyeonggi-do (KR)

(72) Inventors: Su-myeon Kim, Suwon-si (KR); Jeong-hyo Sohn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 15/746,564

(22) PCT Filed: Jun. 21, 2016

(86) PCT No.: PCT/KR2016/006571
§ 371 (c)(1),
(2) Date: Jan. 22, 2018

(87) PCT Pub. No.: WO2017/022949
PCT Pub. Date: Feb. 9, 2017

(65) Prior Publication Data
US 2018/0227836 A1    Aug. 9, 2018

(30) Foreign Application Priority Data

Aug. 5, 2015   (KR) .................. 10-2015-0110710

(51) Int. Cl.
*H04W 48/16* (2009.01)
*H04W 48/14* (2009.01)
(Continued)

(52) U.S. Cl.
CPC ........... *H04W 48/16* (2013.01); *H04W 24/02* (2013.01); *H04W 48/14* (2013.01); *H04W 84/12* (2013.01)

(58) Field of Classification Search
CPC ..... H04W 48/16; H04W 48/14; H04W 24/02; H04W 84/12
See application file for complete search history.

(56) References Cited

U.S. PATENT DOCUMENTS 7,907,945 B2    3/2011  Deprun
8,315,232 B2    11/2012 Park
(Continued)

FOREIGN PATENT DOCUMENTS

CN    102497667 A    6/2012
CN    103796280 A    5/2014
(Continued)

OTHER PUBLICATIONS

Chinese Office Action dated Apr. 16, 2020, issued in Chinese Application No. 201680045628.0.

*Primary Examiner* — Andrew Lai
*Assistant Examiner* — Harry H Kim
(74) *Attorney, Agent, or Firm* — Jefferson IP Law, LLP

(57) ABSTRACT

Provided is a control method of a server providing information on an optimum AP. The control method of a server includes: acquiring wireless communication connection information of at least one user terminal and location information of the at least one user terminal, from each of the at least one user terminal; when a request for an access point (AP) search is received from a first user terminal, determining at least one optimum AP which can connect with the first user terminal, on the basis of the acquired wireless communication connection information and location information; and transmitting information on the determined optimum AP to the first user terminal.

12 Claims, 16 Drawing Sheets

(51) Int. Cl.
*H04W 24/02* (2009.01)
*H04W 84/12* (2009.01)

(56) References Cited

U.S. PATENT DOCUMENTS

| | | | |
|---|---|---|---|
| 8,666,399 B2 | 3/2014 | Kholaif et al. | |
| 8,744,404 B2 | 6/2014 | Butler et al. | |
| 8,929,349 B2 | 1/2015 | Park | |
| 9,173,232 B2 | 10/2015 | Lee et al. | |
| 9,942,829 B2* | 4/2018 | Canpolat | H04W 48/20 |
| 10,028,319 B2 | 7/2018 | Yu et al. | |
| 2003/0118015 A1 | 6/2003 | Gunnarsson et al. | |
| 2005/0113028 A1* | 5/2005 | Uchida | H04W 48/16 455/67.7 |
| 2009/0147697 A1* | 6/2009 | Malik | H04W 48/08 370/254 |
| 2011/0263274 A1* | 10/2011 | Fox | H04W 60/00 455/456.2 |
| 2013/0208662 A1* | 8/2013 | Lee | H04W 36/0058 370/328 |
| 2014/0023013 A1* | 1/2014 | Lee | H04W 28/24 370/329 |
| 2014/0199968 A1* | 7/2014 | Canpolat | H04W 52/0216 455/411 |
| 2014/0211776 A1* | 7/2014 | Jang | H04W 48/16 370/338 |
| 2015/0023341 A1* | 1/2015 | Zhao | H04W 64/003 370/338 |
| 2015/0351021 A1* | 12/2015 | Zhang | H04W 48/18 455/432.1 |
| 2016/0142870 A1* | 5/2016 | Morioka | G01S 5/0236 455/456.1 |
| 2016/0219485 A1 | 7/2016 | Kwon | |
| 2017/0347384 A1 | 11/2017 | Yu et al. | |

FOREIGN PATENT DOCUMENTS

| | | |
|---|---|---|
| CN | 103916816 A | 7/2014 |
| CN | 104604299 A | 5/2015 |
| CN | 104618991 A | 5/2015 |
| CN | 105027629 A | 11/2015 |
| KR | 10-2005-0051050 A | 6/2005 |
| KR | 10-2011-0139960 A | 12/2011 |
| KR | 10-2013-0081390 A | 7/2013 |
| KR | 10-2013-0115642 A | 10/2013 |
| KR | 10-1319153 B1 | 10/2013 |
| KR | 10-2015-0025093 A | 3/2015 |
| WO | 2012/050387 A2 | 4/2012 |
| WO | 2014/052338 A1 | 4/2014 |
| WO | 2014/160882 A1 | 10/2014 |

* cited by examiner

FIG. 5B

| | Zone ID | AP ID | CONDITION #1 (MOBILE) | CONDITION #2 (COMMUNICATIONS COMPANY OF CONNECTED TERMINAL) | CONDITION #3 (NUMBER OF CONNECTED TERMINALS) | CONDITION #4 (AVERAGE COMMUNICATION RATE, Mbit) |
|---|---|---|---|---|---|---|
| 541 | Zone #1 | #1 | N | B, A | 1 | 30 |
| | | #2 | N | B | 2 | 40 |
| | | #3 | N | A | 1 | 20 |
| 543 | Zone #2 | | | | | |

(column headers numbered 530, 531, 533, 535, 537, 539)

FIG. 5C

| | REQUESTING TERMINALS | OPTIMUM HOTSPOT LIST PROVIDED BY SERVER | NOTE |
|---|---|---|---|
| 561 | TERMINAL OF COMMUNICATIONS COMPANY B | #2 | AP #2 HAS HIGH AVERAGE COMMUNICATION RATE |
| 563 | TERMINAL OF COMMUNICATIONS COMPANY A | #1 | AP #1 HAS HIGH AVERAGE COMMUNICATION RATE |
| 565 | TERMINAL OF COMMUNICATIONS COMPANY C | #1 | P #2 AND AP #3 ARE DETECTED AS ONLY FOR COMMUNICATIONS COMPANY IN PATTERN USING ONLY TERMINAL OF SPECIFIC COMMUNICATIONS COMPANY AND IS FILTERED OUT |

| Zone ID | WIFI ID | CONDITION #1 (MOBILE) | CONDITION #2 (COMMUNICATIONS COMPANY OF CONNECTED TERMINAL) | CONDITION #3 (NUMBER OF CONNECTED TERMINALS) | CONDITION #4 (AVERAGE COMMUNICATION RATE, Mbit) |
|---|---|---|---|---|---|
| Zone #1 | #1 | Y | A | 1 | 30 |
|  |  |  |  |  |  |
|  |  |  |  |  |  |
| Zone #2 | #1 | Y | A | 1 | 30 | ial, in a case in which a user command for an AP search is
SERVER PROVIDING LIST OF WIRELESS HOT-SPOTS FOR MOBILE TERMINAL AND CONTROL METHOD THEREFOR

TECHNICAL FIELD

The present disclosure relates to an electronic apparatus, a server, and a system, and more particularly, to an electronic apparatus, a server, and a system using wireless communication.

BACKGROUND ART

An electronic apparatus may recently perform various functions. A significant portion of the various functions is performed through wireless communication. Accordingly, the wireless communication using Wi-Fi has been rapidly developed.

A Wi-Fi technology is a technology capable of wirelessly connecting Internet or a subscriber network using a user terminal such as a smartphone, a notebook having a wireless LAN card mounted therein, or the like within a range of 30 m to 100 m, and the connection through Wi-Fi is performed through communication between the user terminal and a connection device called as an access point (AP). Here, an area in which wireless Internet is possible through Wi-Fi is referred to as a hot spot.

In order to connect to Wi-Fi through the user terminal, when the user terminal searches for the AP, a list of all APs which are present within a predetermined distance from the user terminal is provided. As an example, however, in the case of the AP which is included in the list of the APs but is usable by only a communications company different from of a communications company of the user terminal, there is inconvenience that a user may not use the AP even though the AP is included in the list.

Therefore, a need for solving a problem that unnecessary AP information is provided by providing only the AP which may be wireless communication connected with the user terminal has emerged.

DISCLOSURE

Technical Problem

An object of the present disclosure is to provide a server providing an optimum AP which may be connected with a user terminal, a method for providing a server, a user terminal, and a control method and system of a user terminal, in a case in which a user command for an AP search is input or in a situation corresponding thereto.

Technical Solution

According to an aspect of the present disclosure, a control method of a server providing information on an optimum access point (AP) includes acquiring wireless communication connection information of one or more user terminals and zone information of the one or more user terminals from each of the one or more user terminals; when a request for an AP search is received from a first user terminal, determining at least one optimum AP which is connected with the first user terminal based on the acquired wireless communication connection information and zone information; and transmitting information on the determined optimum AP to the first user terminal.

The wireless communication connection information may include at least one of information on a communications company, information on the AP connected with the user terminal, and an average communication rate with the connected AP, and the zone information of the user terminals may include a wireless communication connection start zone and a wireless communication connection terminate zone.

The control method may include storing at least one AP which is present at a specific zone, and information on a communications company connected with the at least one AP, an average communication rate of the at least one AP, and whether or not a zone of the at least one AP is moved, based on the wireless communication connection information and the zone information of the one or more user terminals.

In the determining of the at least one optimum AP, when the request for the AP search is received from the first user terminal which is present at the specific zone, the optimum AP may be determined by comparing information on a communications company of the first user terminal with information on a communications company connected with the at least one AP which is present at the specific zone.

In the determining of the at least one optimum AP, when the request for the AP search is received from the first user terminal which is present at the specific zone, an AP having the average communication rate of a predetermined value or more may be determined as the optimum AP.

In the determining of the at least one optimum AP, when the wireless communication connection start zone and the wireless communication connection terminate zone are different from each other, and the request for the AP search is received from the first user terminal which is present at the specific zone, the optimum AP may be determined using whether or not a zone of the at least one AP which is present at the specific zone is moved.

In the acquiring of the wireless communication connection information and the zone information, the wireless communication connection information and the zone information of the one or more user terminals may be acquired at a predetermined period, or the wireless communication connection information and the zone information of the one or more user terminals may be acquired according to a user command.

According to another aspect of the present disclosure, a server providing information on an optimum access point (AP) includes a communicator configured to communicate with a user terminal; a memory; and a controller configured to control the communicator to receive wireless communication connection information of one or more user terminals and zone information of the one or more user terminals from each of the one or more user terminals, and control the communicator, when a request for an AP search is received from a first user terminal, to determine at least one optimum AP which is connected with the first user terminal based on the received wireless communication connection information and zone information and to transmit information on the optimum AP to the first user terminal.

The wireless communication connection information may include at least one of information on a communications company, information on the AP connected with the user terminal, and an average communication rate with the connected AP, and the zone information of the user terminals may include a wireless communication connection start zone and a wireless communication connection terminate zone.

The server may further include a memory configured to at least one AP which is present at a specific zone, and information on a communications company connected with the at least one AP, an average communication rate of the at least one AP, and whether or not a zone of the at least one AP is moved, based on the wireless communication connection information and the zone information of the one or more user terminals.

When the request for the AP search is received from the first user terminal which is present at the specific zone, the controller may determine the optimum AP by comparing information on a communications company of the first user terminal with information on a communications company connected with the at least one AP which is present at the specific zone.

When the request for the AP search is received from the first user terminal which is present at the specific zone, the controller may determine an AP having the average communication rate of a predetermined value or more as the optimum AP.

When the wireless communication connection start zone and the wireless communication connection terminate zone are different from each other, and the request for the AP search is received from the first user terminal which is present at the specific zone, the controller may determine the optimum AP using whether or not a zone of the at least one AP which is present at the specific zone is moved.

The controller may control the communicator to acquire the wireless communication connection information and the zone information of the one or more user terminals at a predetermined period, or to acquire the wireless communication connection information and the zone information of the one or more user terminals according to a user command.

According to another aspect of the present disclosure, a control method of a user terminal includes transmitting zone information and communications company information of the user terminal to a server, when a user command for a request for an AP search is input; receiving information on an optimum AP determined based on the zone information and communications company information of the user terminal from the server; and displaying the received information on the optimum AP.

In the displaying of the received information on the optimum AP, the optimum AP may be aligned and displayed in the order having a high average communication rate using the information on the optimum AP.

The control method may further include, when the received optimum AP is one, wireless communication connecting with the received optimum AP.

According to another aspect of the present disclosure, a user terminal includes a communicator configured to communicate with a server; a display; and a controller configured to control the display to transmit zone information and communications company information of the user terminal to a server, when a user command for a request for an AP search is input; receive information on an optimum AP determined based on the zone information and communications company information of the user terminal from the server; and display the received information on the optimum AP.

According to another aspect of the present disclosure, a control method of a system including a server and a user terminal includes acquiring, by the server, wireless communication connection information of one or more user terminals and zone information of the one or more user terminals from each of the one or more user terminals; transmitting, by a first user terminal, the zone information and communications company information of the user terminal to the server, when a user command for a request for an AP search is input; when the request for an AP search is received from the first user terminal, determining, by the server, at least one optimum AP which is connected with the first user terminal based on the zone information and the communications company information of the first user terminal and the wireless communication connection information and zone information of the one or more user terminals; transmitting, by the server, information on the optimum AP to the first user terminal; and displaying, by the first user terminal, the information on the optimum AP.

Advantageous Effects

As described above, according to the diverse exemplary embodiments of the present disclosure, the user may more easily and simply connect the wireless communication through the information on the optimum AP.

DESCRIPTION OF DRAWINGS

FIGS. 5A to 5C are diagrams illustrating examples providing an optimum AP information according to a communications company of the user terminal, according to an exemplary embodiment of the present disclosure;

FIGS. 6A and 6B are diagrams illustrating examples providing the optimum AP information according to whether or not a position of the user terminal is moved, according to an exemplary embodiment of the present disclosure;

BEST MODE

Figure 1:
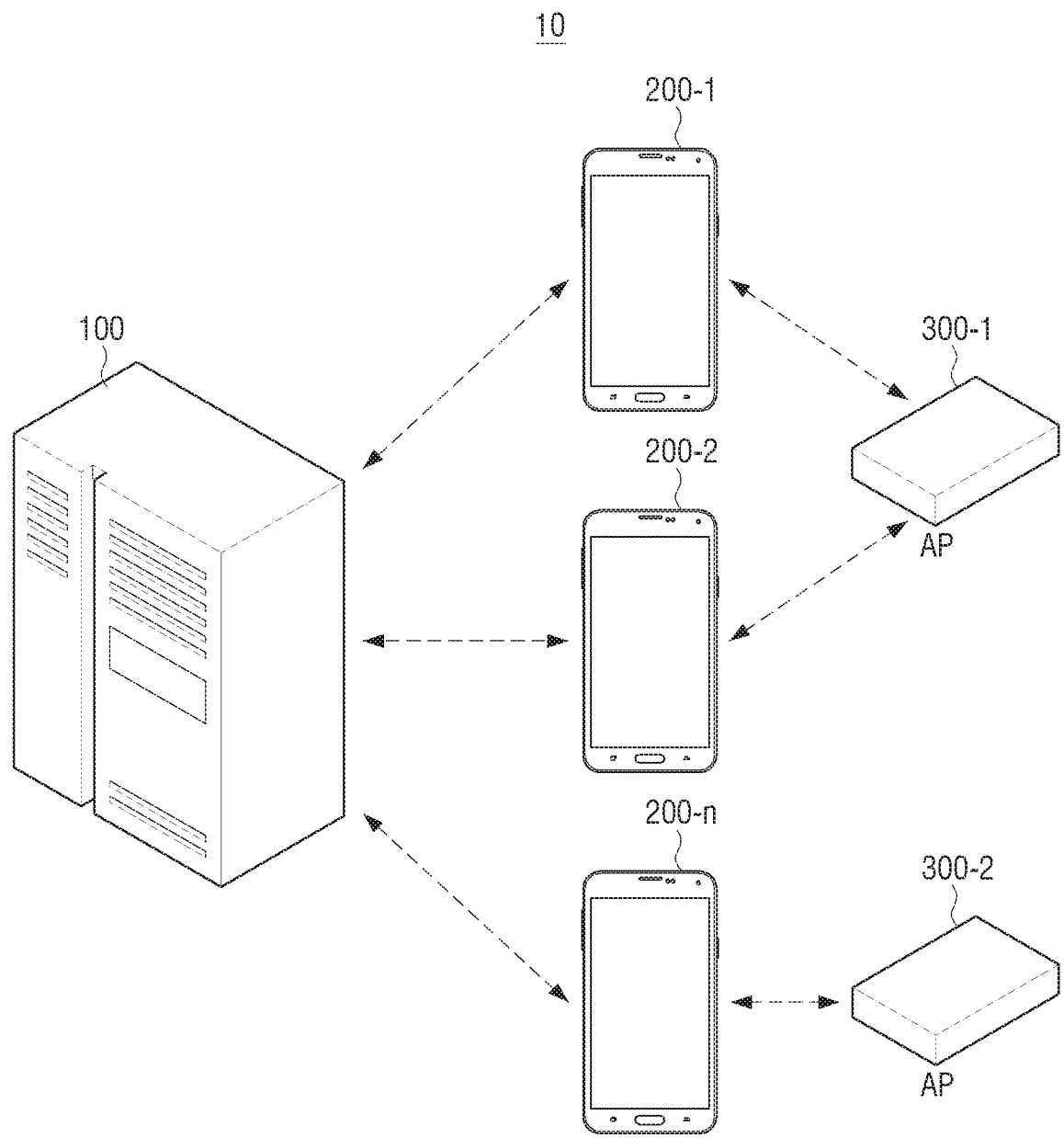
FIG. 1 is a systematic diagram of a server and a user terminal according to an exemplary embodiment of the present disclosure.

Terms used in exemplary embodiments of the present disclosure will be briefly described and the present exemplary embodiments will be described in detail.

As the terms used in the exemplary embodiments of the present disclosure, general terms which are currently used as widely possible as are selected, but may be varied depending on an intention of those skilled in the art, a practice, an emergence of new technologies, and the like. In addition, in a certain case, there are terms which are arbitrarily selected by an applicant, and in this case, a meaning thereof will be described in detail in a description part of the exemplary embodiments corresponding to the terms. Therefore, the terms used in the present exemplary embodiments should be defined based on the meanings of the terms and the contents throughout the present exemplary embodiments, not simple names of the terms.

In the exemplary embodiments of the present disclosure, terms including an ordinal number such as first, second, and the like may be used to describe various components, but the components are not limited by the terms. The terms are only used to distinguish one component from the others. For example, the first component may be named the second component and the second component may also be similarly named the first component, without departing from the scope of the present disclosure. A term and/or includes a combination of a plurality of related described items or any one of the plurality of related described items.

In addition, singular forms used in the exemplary embodiments of the present disclosure include plural forms unless the context clearly indicates otherwise.

In addition, it is to be understood that the terms "comprises" or "have" used in the exemplary embodiments of the present disclosure, specify the presence of stated features, numerals, steps, operations, components, parts, or a combination thereof, but do not preclude the presence or addition of one or more other features, numerals, steps, operations, components, parts, or a combination thereof.

In the exemplary embodiment of the present disclosure, a 'module' or a 'unit' performs at least one function or operation, and may be implemented in hardware, software, or a combination of hardware and software. In addition, a plurality of 'modules' or a plurality of 'units' may be integrated into at least one module and may be implemented in at least one processor, except for a 'module' or a 'unit' in which they need to be implemented in specific hardware.

In the exemplary embodiment of the present disclosure, a case in which any one part is "connected" with the other part includes a case in which the parts are "directly connected" with each other and a case in which the parts are "electrically connected" with each other having other elements interposed therebetween.

In addition, in the exemplary embodiments of the present disclosure, a user input may include at least one of a touch input, a bending input, a voice input, a button input, and a multimodal input, but is not limited thereto.

In addition, in the exemplary embodiments of the present disclosure, an "application" is referred to a collection of a series of computer programs devised to perform a specific task. In the exemplary embodiments of the present disclosure, various applications may be present. For example, examples of the application may include a game application, a video play application, a map application, a memo application, a calendar application, a phone book application, a broadcasting application, an exercise supporting application, a payment application, a picture folder application, and the like, but are not limited thereto.

Unless indicated otherwise, it is to be understood that all the terms used herein including technical and scientific terms have the same meaning as those that are generally understood by those who skilled in the art. It should be construed that the terms defined in the dictionary which is generally used are identical with the meanings within the context of the related art, and they should not be ideally or excessively formally construed unless clearly defined otherwise in the present application.

Hereinafter, the present disclosure will be described with reference to the accompanying drawings. FIG. 1 is a diagram illustrating a system for providing an optimum AP according to an exemplary embodiment of the present disclosure. As illustrated in FIG. 1, a system 10 for providing an optimum AP includes a server 100 for providing an optimum AP, a plurality of user terminals 200-1, 200-2, . . . , 200-n, and access points (AP) 300-1 and 300-2. In this case, the user terminals may be implemented in various user terminals such as a smartphone, a PDA, a tablet PC, a notebook PC, and the like.

The server 100 may perform a function of providing information on an optimum AP based on information on the APs and information on the user terminals 200. In particular, the server 100 may perform a function of providing the information on the optimum AP which may be connected with the user terminal 200 using information on a communications company of the AP which is present at a specific position, information on an average communications rate of the AP, and whether or not a zone of the AP is moved.

Specifically, the server 100 acquires wireless communication connection information of the plurality of user terminals and zone information of the plurality of user terminals from each of the plurality of user terminals 200-1, 200-2, . . . , 200-n. The wireless communication connection information may include one of communications company information, AP information connected with the user terminal, and average communication rate with the connected AP, and the zone information of the user terminal may include a wireless communication connection start zone and a wireless communication connection terminate zone.

The server 100 may store an AP which is present at a specific zone, and information on a communications company connected with the AP, an average communication rate of the AP, and whether or not a zone of the AP is moved, based on the received wireless communication connection information and zone information of the plurality of user terminals 200-1, 200-2, . . . , 200-n. For example, the server 100 may determine that APs included in a ZONE #1 are an AP #1 and an AP #2, and may store information on communications companies of the user terminals connected with the AP #1 and the AP #2, an average communication rate of the AP #1 and the AP #2, and whether or not zones of the AP #1 and the AP #2 are moved.

When a request for an AP search is received from a first user terminal 200-1, the server 100 determines at least one optimum AP which may be connected with the first user terminal 200-1 based on the stored wireless communication connection information and zone information of the plurality of user terminals. In order to determine the optimum AP, the server 100 determines ZONE ID of a specific zone corresponding to a zone of the first terminal 200-1. The server 100 determines at least one optimum AP, based on information on communications companies of a plurality of APs included in the corresponding ZONE ID, an average communication rate of the plurality of APs, and whether or not zones of the plurality of APs are moved. Here, the information on the communications companies of the APs, the average communication rate of the APs, and whether or not the zones of the APs are moved may be determined based on the wireless communication connection information and the zone information which are received from the plurality of user terminals 200-1, 200-2, . . . , 200-n and stored.

If the optimum AP is determined, the server 100 transmits information on the optimum AP to the first user terminal 200-1.

The user terminal 200 transmits the zone information and the communications company information of the user terminal 200 to the server 100, and receives the information on the optimum AP determined by the server 100. If the information on the optimum AP is received, the user terminal 200 displays the information on the optimum AP.

Specifically, if a user command for an AP search request is input, the user terminal 200 transmits the zone information and communications company information of the user terminal 200 to the server 100. The user terminal 200 receives the information on the optimum AP determined based on the transmitted zone information and communications company information of the user terminal 200 from the server 100. The user terminal 200 displays the received information on the optimum AP.

The APs 300-1 and 300-2 perform a function supporting wireless communication of the user terminal 200. The APs 300-1 and 300-2 support a standard transmitting and receiving data using a radio frequency. Further, the APs 300-1 and 300-2 have limited access authority. For example, a specific AP may be connected with only the user terminals of some communications companies.

Figure 2:
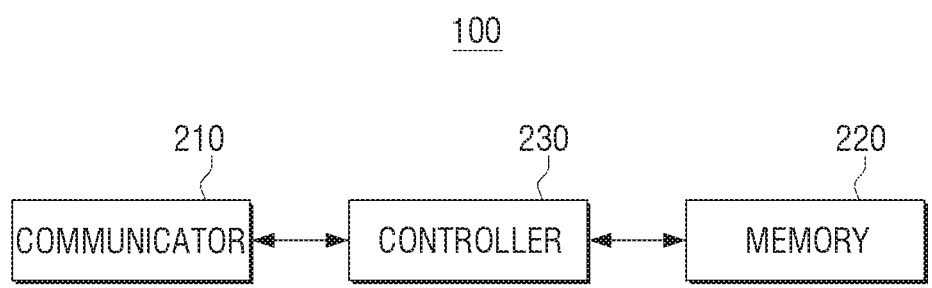
FIG. 2 is a block diagram briefly illustrating a configuration of the server according to an exemplary embodiment of the present disclosure.

FIG. 2 is a block diagram illustrating a configuration of the server 100 according to an exemplary embodiment of the present disclosure. As illustrated in FIG. 2, the server 100 includes a communicator 210, a memory 220, and a controller 230.

The communicator 210 performs communication with the user terminal 200. In particular, the communicator 210 may transmit and receive the wireless communication connection information and the zone information of the user terminal 200 with the user terminal 200.

The memory 220 stores the communications company information and the zone information of the AP. In particular, the memory 220 may store information on a communications company of an AP which is present at a specific zone, an average communication rate of the AP, and whether or not a zone of the AP is moved, based on the wireless communication connection information and the zone information of the plurality of user terminals 200-1, 200-2, . . . , 200-n.

The controller 230 controls an overall operation of the server 100. In particular, if a request for an AP search is received from the first user terminal 200-1 through the communicator 210, the controller 230 determines an optimum AP which may be connected with the first user terminal 200-1 based on the received wireless communication connection information and zone information of the user terminal 200. In addition, the controller 230 controls the communicator 210 to transmit the determined optimum AP to the first user terminal 200-1.

In particular, the controller 230 controls the communicator 210 to acquire the wireless communication connection information of the plurality of user terminals 200-1, 200-2, . . . , 200-n and the zone information of the plurality of user terminals 200-1, 200-2, . . . , 200-n from each of the plurality of user terminals 200-1, 200-2, . . . , 200-n. In this case, the controller 230 may control the communicator 210 to acquire the wireless communication connection information of the plurality of user terminals 200-1, 200-2, . . . , 200-n and the zone information of the plurality of user terminals 200-1, 200-2, . . . , 200-n from each of the plurality of user terminals 200-1, 200-2, . . . , 200-n at a predetermined period. Alternatively, the controller 230 may control the communicator 210 to acquire the wireless communication connection information of the plurality of user terminals 200-1, 200-2, . . . , 200-n and the zone information of the plurality of user terminals 200-1, 200-2, . . . , 200-n from each of the plurality of user terminals 200-1, 200-2, . . . , 200-n according to a user command.

In this case, the wireless communication connection information may include at least one of communications company information, information on the AP connected with the plurality of user terminals 200-1, 200-2, . . . , 200-n, and average communication rate of the AP with the plurality of user terminals 200-1, 200-2, . . . , 200-n. The zone information of the plurality of user terminals 200-1, 200-2, . . . , 200-n may include a wireless communication connection start zone and a wireless communication connection terminate zone.

The controller 230 may control the memory 220 to store an AP which is present at a specific zone, and information on a communications company connected with the AP, an average communication rate of the AP, and whether or not a zone of the AP is moved, based on the received wireless communication connection information and zone information of the plurality of user terminals 200-1, 200-2, . . . , 200-n. For example, the controller 230 may determine that APs included in a ZONE #1 are an AP #1 and an AP #2, and may store information on communications companies of the user terminals connected with the AP #1 and the AP #2, an average communication rate of the AP #1 and the AP #2, and whether or not zones of the AP #1 and the AP #2 are moved. For example, the controller 230 may control the memory 210 to store that the AP #1 present in the ZONE #1 may communicate with the user terminal of a communications company A, the average communication rate is 30 Mbit, and no zone is moved.

In addition, when a request for an AP search is received from the first user terminal 200-1, the controller 230 determines at least one optimum AP which may be connected with the first user terminal 200-1 based on the stored wireless communication connection information and zone information. Specifically, when the request for the AP search is received from the first user terminal 200-1, the controller 230 acquires zone information (ZONE ID) and communications company information of the first user terminal 200-1.

In addition, the controller 230 may determine the AP which is currently present at the zone of the first user terminal 200-1 based on the acquired zone information of the first user terminal 200-1. In addition, the controller 230 may compare information on the AP which is present at the zone of the first user terminal 200-1 with the acquired communications company information of the first user terminal 200-1 to determine the optimum AP of the first user terminal 200-1.

According to another exemplary embodiment, the controller 230 may determine an AP which may be connected with the first user terminal 200-1 and has the average communication rate of a predetermined value or more as the optimum AP. Specifically, when the request for the AP search is received from the first user terminal 200-1, the controller 230 acquires the zone information (ZONE ID) and the communications company information of the first user terminal 200-1. In addition, the controller 230 may determine the AP which is currently present at the zone of the first user terminal 200-1 based on the acquired zone information of the first user terminal 200-1. In a case in which the average communication rate of the first user terminal 200-1 is set to 30 Mbit or more, the controller 230 may determine an AP having the average communication rate of 30 Mbit or more among the APs which are present at the zone of the first user terminal 200-1 as the optimum AP.

In addition, when the request for the AP search is received while the user terminal of which the wireless communication connection start zone and the wireless communication connection terminate zone are different from each other is present at a specific zone, the controller 230 controls the communicator 210 to receive specific zone information of the first user terminal 200-1. The controller 230 may determine an AP of which a zone is moved among the APs which are present at the specific zone as the optimum AP. Since the wireless communication connection start zone and the wireless communication connection terminate zone of the first user terminal 200-1 are different from each other means that the first user terminal 200-1 is moving, it is necessary for the first user terminal to be connected with a mobile AP.

Figure 3:
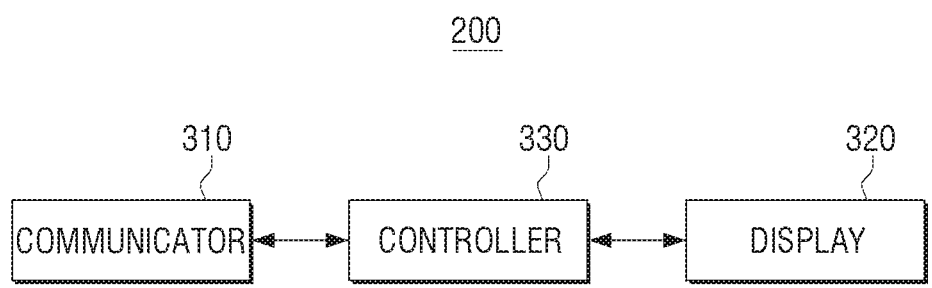
FIG. 3 is a block diagram briefly illustrating a configuration of the user terminal according to an exemplary embodiment of the present disclosure.

FIG. 3 is a block diagram illustrating a configuration of the user terminal 200 according to an exemplary embodiment of the present disclosure. As illustrated in FIG. 3, the user terminal 200 includes a communicator 310, a display 320, and a controller 330. Meanwhile, the user terminal 200 according to an exemplary embodiment of the present disclosure may be implemented in a user terminal which may perform a wireless communication connection such as a smai tphone, a smart watch, a tablet PC, a notebook PC, or the like.

The communicator 310 performs communication with the server 100. In particular, the communicator 310 transmits wireless communication connection information and zone information of the user terminal 200 to the server 100 and receives information on an optimum AP.

The display 320 outputs image data. In particular, the display 320 displays the information on the optimum AP received from the server 100.

The controller 330 may control an overall operation of the user terminal 200. In particular, if a user command for an AP search is input, the controller 330 controls the communicator 310 to transmit the zone information and the communications company information of the user terminal 200 to the server 100. The controller 330 controls the communicator 310 to receive the information on the optimum AP determined based on the zone information and the communications company information of the user terminal from the server 100.

In addition, the controller 330 controls the display 320 to display the received information on the optimum AP. The controller 330 may control the display 320 to align and display the information on the optimum AP in the order in which the average communication rate of the optimum AP is high using the information on the optimum AP.

In addition, the controller 330 may simultaneously display the AP corresponding to the optimum AP and the APs which do not correspond to the optimum AP, and may display the AP corresponding to the optimum AP by a method different from the APs which do not correspond to the optimum AP.

In addition, in a case in which the received information on the optimum AP includes only one AP, the controller 330 may control the communicator 310 to immediately connect wireless communication with the received one AP.

Figure 4:
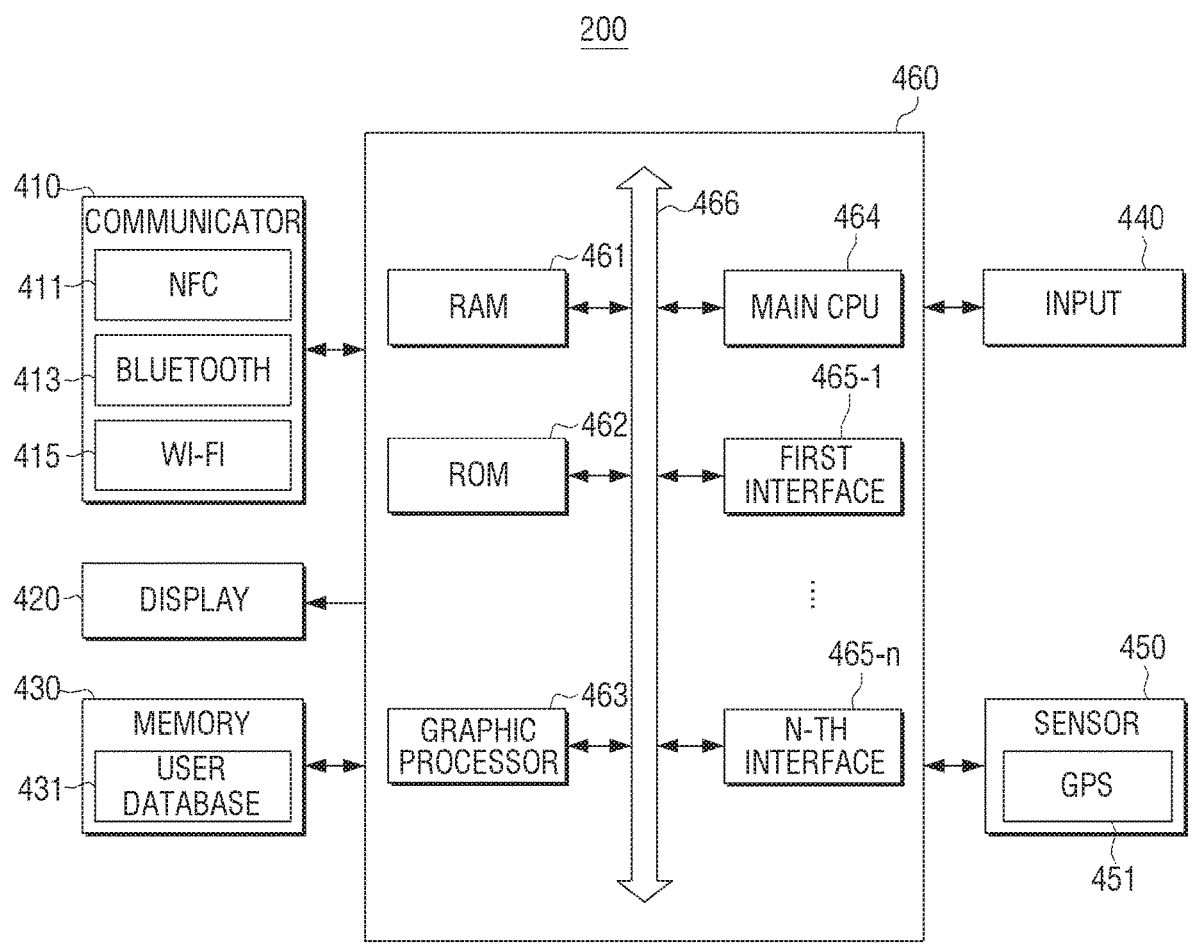
FIG. 4 is a block diagram illustrating the configuration of the user terminal in detail, according to an exemplary embodiment of the present disclosure.

FIG. 4 is a block diagram illustrating the configuration of the user terminal 200 according to an exemplary embodiment of the present disclosure in detail. As illustrated in FIG. 4, the user terminal 200 includes a communicator 410, a display 420, a memory 430, an input 440, a sensor 450, and a controller 460.

Depending on exemplary embodiments, some of the components illustrated in FIG. 4 may be omitted or modified, and other components may also be further added.

The communicator 410 is a component performing communication with the server 100 according to various types of communication schemes. The communicator 410 may include various communicating chips such as a Wi-Fi chip, a Bluetooth chip, an NFC chip, a wireless communication chip, and the like. Here, the Wi-Fi chip, the Bluetooth chip, and the NFC chip perform communication in a Wi-Fi scheme, a Bluetooth scheme, and an NFC scheme, respectively. Among these chips, the NFC chip means a chip which is operated in the NFC scheme using a frequency band of 13.56 MHz among various RF-ID frequency bands such as 135 kHz, 13.56 MHz, 433 MHz, 860 to 960 MHz, 2.45 GHz, and the like. In the case in which the Wi-Fi chip or the Bluetooth chip is used, the communicator 410 may first transmit and receive a variety of access information such as SSID, a session key, and the like, perform a communication connection using the variety of access information, and then transmit and receive a variety of information. The wireless communication chip means a chip that performs communication according to various communication standards such as IEEE, ZigBee, 3rd generation (3G), 3rd generation partnership project (3GPP), Long Term Evolution (LTE), and the like.

In particular, the communicator 410 may transmit the wireless communication connection information and the zone information to the server 100. In addition, the communicator 410 may receive the information on the optimum AP from the server 100. In addition, the communicator 410 may perform communication with the AP that serves to transmit and receive Internet data.

The display 420 displays at least one of a video frame obtained by processing image data received from an image receiver (not shown) by an image processor (not shown) and various screens generated by a graphic processor 463. In particular, the display 420 may displays the information on the optimum AP received from the server 100. In addition, the display 420 may align the APs in the order of the optimum AP having a high communication rate received from the server 100 to display AP ID.

The memory 430 stores various modules for driving the user terminal 200. For example, the memory 430 may store software including a base module, a sensing module, a communication module, a presentation module, a web browser module, and a service module. In this case, the base module is a basic module processing signals transferred from the respective hardware included in the user terminal 200 and transferring the processed signals to a high layer module. The sensing module, which is a module collecting information from a variety of sensors, and analyzing and managing the collected information, may also include a face recognizing module, a voice recognizing module, a motion recognizing module, an NFC recognizing module, and the like. The presentation module, which is a module for configuring a display screen, may include a multimedia module for reproducing and outputting multimedia contents and a UI rendering module performing a UI and graphic processing. The communication module is a module for performing communication with the outside. The web browser module means a module performing a web browsing to access a web server. The service module is a module including a variety of applications for providing various services.

As described above, the memory 430 may include various program modules, but some of various program modules may be omitted, modified or added depending on a kind and feature of the user terminal 200. For example, in a case in which the user terminal 200 described above is implemented as the tablet PC, the base module may further include a location determining module for determining a GPS based location, and the sensing module may further include a sensing module for sensing a motion of a user.

Meanwhile, according to an exemplary embodiment of the present disclosure, the memory 460 may be defined as including ROM 462 and RAM 461 in the controller 430, or a memory card (not shown) (e.g., a micro SD card, a memory stick) mounted in the user terminal 200.

An input 440 receives a user command for controlling the user terminal 200. The input 440 may include various input devices such as a touch input, a button, a voice input, a motion input, a keyboard, a mouse, and the like for receiving the user command. In particular, when a plurality of optimum APs are received, the input 440 may receive a user command for selecting the AP.

The sensor 450 may sense a surrounding environment of the user terminal 200. The sensor 450 may include a GPS sensor capable of sensing location information. The sensor 450 may include various sensors such as a motion sensor (e.g., a gyro sensor, an acceleration sensor, or the like) capable of sensing a motion of the user terminal 200, a pressure sensor, a noise sensor, and the like. In particular, the sensor 450 may sense the location of the user terminal 200 through the GPS sensor.

As illustrated in FIG. 4, the controller 460 includes a random access memory (RAM) 641, a read only memory (ROM) 642, a graphic processor 463, a main central processing unit (CPU) 464, first to n-th interfaces 465-1 to 465-n, and a bus 466. Here, the RAM 461, the ROM 462, the graphic processor 463, the main CPU 464, the first to n-th interfaces 465-1 to 465-n, and the like may be connected to each other through the bus 466.

The ROM 462 stores a set of instructions for booting a system, and the like. When a turn-on instruction is input to supply power, the main CPU 464 copies an operating system (0/S) stored in the memory 430 in the RAM 461 according to the instructions stored in the ROM 462 and executes the 0/S to boot the system. When the booting is completed, the main CPU 464 copies a variety of application programs stored in the memory 430 to the RAM 461, and executes the application programs copied in the RAM 461 to perform a variety of operations.

The graphic processor 463 generates a screen including various objects such as a pointer, an icon, an image, a text, and the like using a calculator (not shown) and a renderer (not shown). The calculator calculates attribute values such as coordinate values, shapes, sizes, colors, and the like in which the respective objects are to be displayed according to a layout of the screen using the control command received from the input. The renderer generates the screens of various layouts including the objects based on the attribute values calculated by the calculator. The screen generated by the renderer is displayed in a display region of the display 420.

The main CPU 464 accesses the memory 430 and performs the booting using the operating system (O/S) stored in the memory 430. In addition, the main CPU 464 performs various operations using a variety of programs, contents, data, and the like stored in the memory 430.

The first to n-th interfaces 465-1 to 465-n are connected to a variety of components described above. One of the interfaces may be a network interface connected to an external device via a network.

In particular, if a user command for an AP search is input through an input 440, the controller 460 controls the communicator 410 to transmit the wireless communication connection information and zone information of the user information 200 to the server 100. The controller 460 controls the communicator 410 to receive the information on the optimum AP determined based on the communications company information and zone information of the user terminal 200 from the server 100. The controller 460 controls the display 420 to display the received information on the optimum AP.

For example, a process in which the user terminal 200 which is located at a ZONE #1 and is connected with a communications company A displays the information on the optimum A will be described. When a user command for an AP search is input through the input 440, the controller 460 may control the communicator 410 to transmit information on the communications company A and ZONE #1 to the server 100. The controller 460 may control the communicator 410 to receive information on at least one optimum AP which may be connected with the communications company A among the APs included in the ZONE #1 determined by the server 100. The controller 460 may control the display 420 to display the received information on the optimum AP.

Figure 5A:
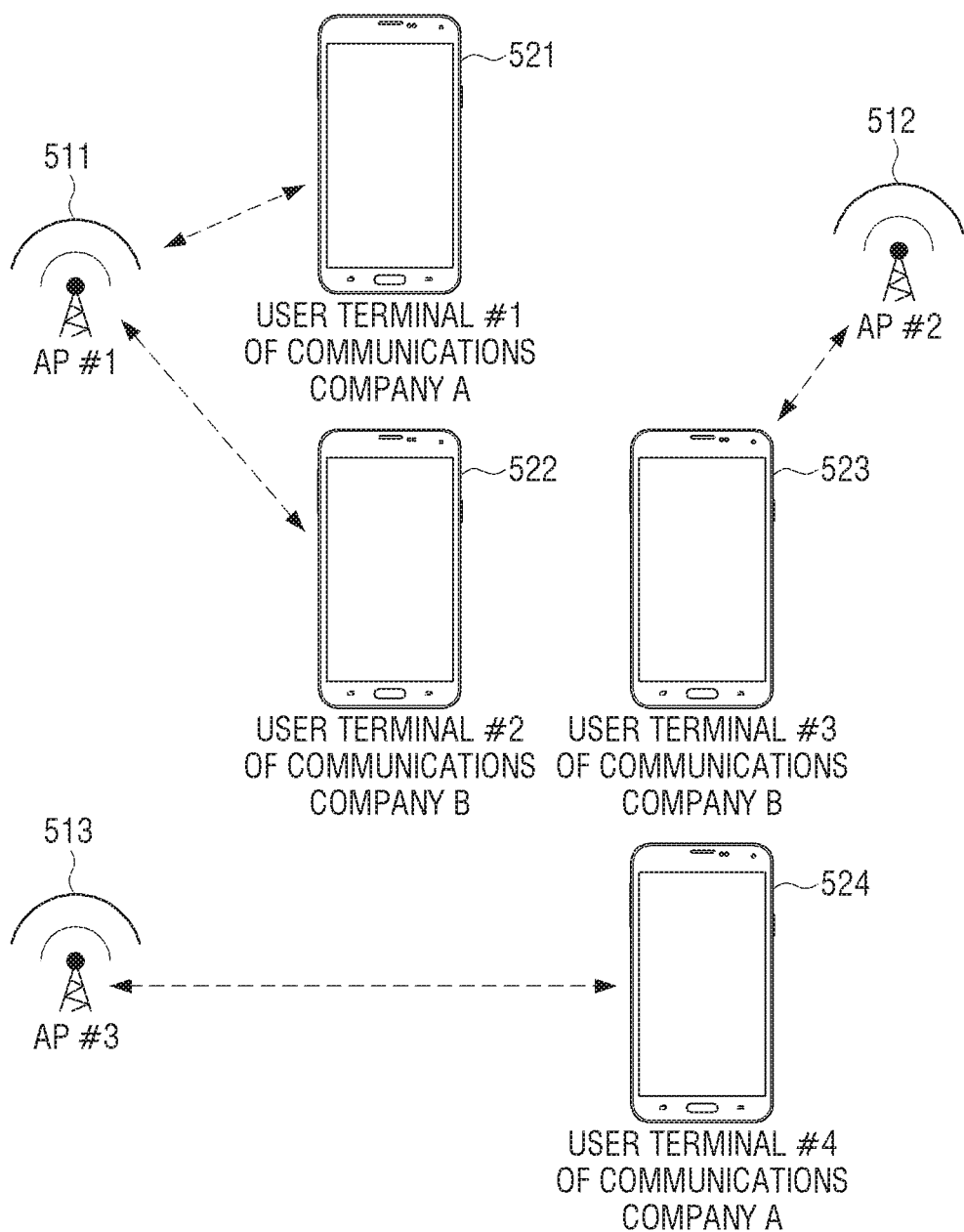

A method for determining, by a server 100, an optimum AP using communications company information and zone information of user terminals when there are a plurality of APs and user terminals will be described with reference to FIGS. 5A to 5C. As illustrated in FIG. 5A, an AP #1 511 with which a user terminal #1 521 of a communications company A and a user terminal #2 522 of a communications company B are wireless communication connected, an AP #2 512 with which a user terminal #3 523 of the communications company B is wireless communication connected, and an AP #3 513 with which a user terminal #4 524 of the communications company A is wireless communication connected are included in the ZONE #1.

The controller 230 controls the communicator 210 to receive wireless communication connection information and zone information of one or more user terminals from each of the user terminal #1 521, the user terminal #2 522, and the user terminal #3 523. In this case, the wireless communication connection information may include at least one of communications company information, information on an AP connected with the user terminal, and an average communication rate with the connected AP, and the zone information may include a wireless communication connection start zone and a wireless communication connection terminate zone. When the wireless communication connection information and the zone information are received, the controller 230 may control the memory 220 to store to the received wireless communication connection information and zone information.

The information stored in the controller 230 may be as illustrated in FIG. 5B. Specifically, the wireless communication connection information received from the user terminal #1 521 is "communications company A, AP #1 511, and 30 Mbit", and the zone information is ZONE #1. The wireless communication connection information received from the user terminal #2 522 is "communications company B, AP #1 511, and 30 Mbit", and the zone information is ZONE #1. The wireless communication connection information received from the user terminal #3 523 is "communications company B, AP #2 512, and 40 Mbit", and the zone information is ZONE #1. The wireless communication connection information received from the user terminal #4 524 is "communications company A, AP #3 513, and 20 Mbit", and the zone information is ZONE #1. Based on the wireless communication connection information and the zone information described above, the controller 230 may control the memory 220 to store that the AP #1 511, the AP #2 512, and the AP #3 513 are included the ZONE #1. The controller 230 may control the memory 220 to store that the AP #1 511 is not mobile, may be connected with the communications companies A and B, and has the average communication rate of 30 Mbit, as the information on the AP #1 511. The controller 230 may control the memory 220 to store that the AP #2 512 is not mobile, may be connected with the communications company B, and has the average communication rate of 40 Mbit, as the information on the AP #2 512. The controller 230 may control the memory 220 to store that the AP #3 513 is not mobile, may be connected with the communications company A, and has the average communication rate of 20 Mbit, as the information on the AP #3 513.

A method for determining, by the controller 230, the optimum AP based on the information stored in the memory 220 will be described with reference to FIG. 5C. When a request for an AP search is received from a user terminal 561 which is located at the ZONE #1 and is connected with the communications company B, the controller 230 may determine whether or not the AP #1 511, the AP #2 512, and the AP #3 513 included in the ZONE #1 are optimum APs. Since the AP which may be connected with the communications company B is the AP #1 511 and the AP #2 512, the controller 230 may determine the AP #1 511 and the AP #2 512 as the optimum APs. In addition, the controller 230 may determine only the AP #2 having a high average communication rate among the AP #1 511 and the AP #2 512 determined as the optimum APs, as an optimum AP.

When the request for the AP search is received from the user terminal 563 which is located at the ZONE #1 and is connected with the communications company A, the controller 230 may determine whether or not the AP #1 511, the AP #2 512, and the AP #3 513 included in the ZONE #1 are optimum APs. Since the AP which may be connected with the communications company A is the AP #1 511 and the AP #3 513, the controller 230 may determine the AP #1 511 and the AP #3 513 as the optimum APs. In addition, the controller 230 may determine only the AP #1 having a high average communication rate among the AP #1 511 and the AP #3 513 determined as the optimum APs, as an optimum AP.

When the request for the AP search is received from a user terminal 565 which is located at the ZONE #1 and is connected with a communications company C, the controller 230 may determine whether or not the AP #1 511, the AP #2 512, and the AP #3 513 included in the ZONE #1 are optimum APs. Since the AP #2 512 is connected with only the communications company B and the AP #3 513 is connected with only the communications company A, the controller 230 may determine that it is impossible to be connected with the communications company C. Since the AP #1 511 is connected with the communications companies A and B, the controller 230 may determine that the AP #1 511 is not an AP which may be connected with only a specific communications company. Therefore, since the AP which may be connected with the user terminal 563 of the communications company C is the AP #1 511, the controller 230 may determine the AP #1 511 as the optimum AP.

Figure 6A:
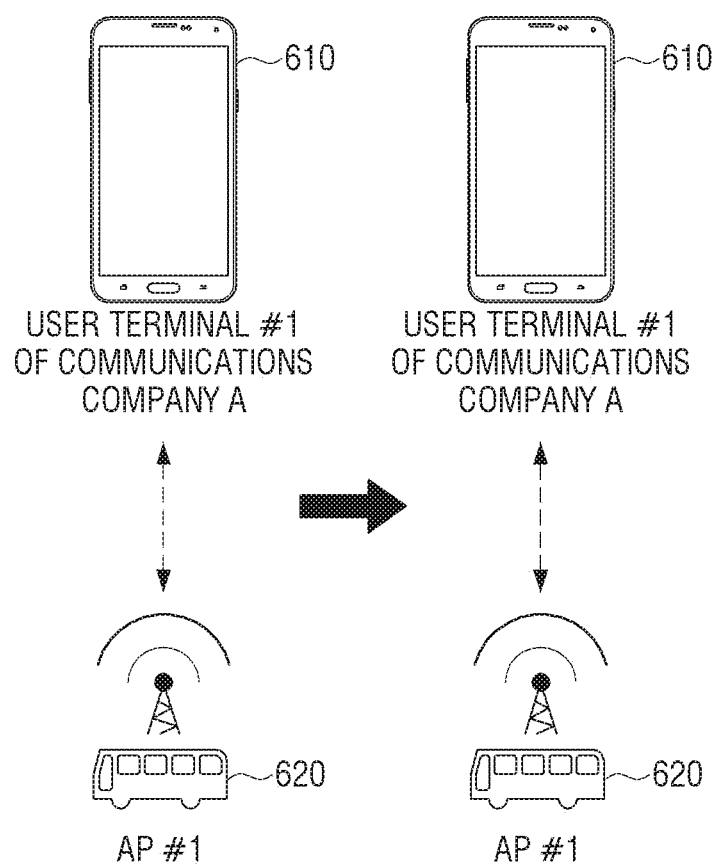

FIGS. 6A and 6B illustrate a process of determining an optimum AP, according to an according to another exemplary embodiment of the present disclosure. A user terminal #1 610 is connected with an AP #1 620. The controller 230 controls the communicator 210 to receive wireless communications connection information and zone information from the user terminal #1 610. Here, the wireless communication connection information may be "communications company A, AP #1 620, and 30 Mbit". The zone information may be "ZONE #1 and ZONE #2".

As illustrated in FIG. 6B, based on the information described above, the controller 230 may control the memory 220 to store conditions that the AP #1 included in the ZONE #1 643 is mobile, communications company A, and 30 Mbit.

For example, when the first user terminal 200-1 which is currently located at the ZONE #2, is connected with the communications company A, and is mobile receives the request for the optimum AP through the communicator 210, the controller 230 may determine the optimum AP using the wireless communication connection information and the zone information. Specifically, since the zone of the first user terminal 200-1 is moving, the controller 230 determines an AP #1 620 of which a wireless communication connection start zone and a wireless communication connection terminal zone are different from each other among the APs included currently in the ZONE #2 to determine the AP #1 620 as the optimum AP.

Figure 7:
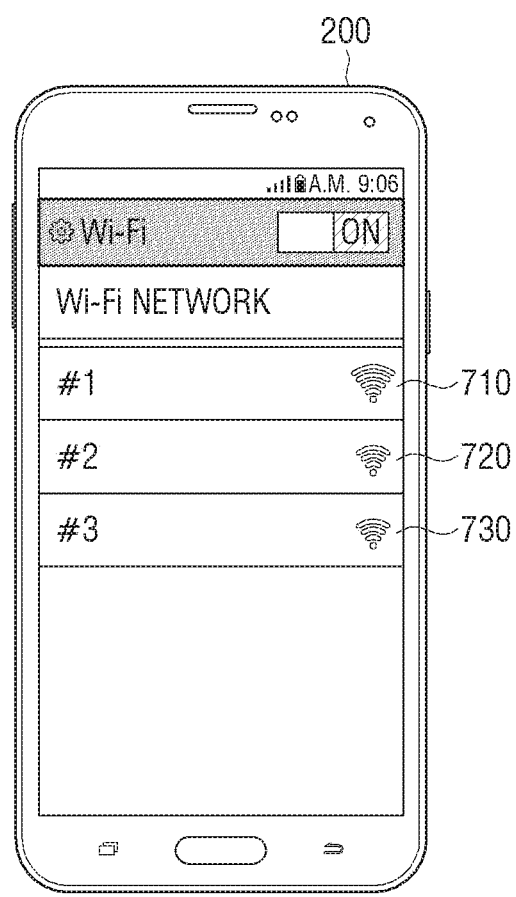
FIGS. 7 and 8 are diagrams illustrating various examples displaying the optimum AP information, according to diverse exemplary embodiments of the present disclosure.

As illustrated in FIG. 7, when the user terminal 200 receives the information on the optimum AP, the controller 330 of he user terminal 200 controls the display 320 to display the information on the optimum AP. The information on the optimum AP may include AP ID, an average communications rate, and the like. The controller 330 may control the display 320 to align and display the information on a plurality of optimum APs in the order in which the average communication rate of the optimum APs is high. In addition, the controller 330 may control the display 320 to perform a displaying in various methods such as upwardly displaying an AP that a secret key does not need to be input to use the AP, or upwardly displaying an AP which was used conventionally, or the like.

Figure 8:
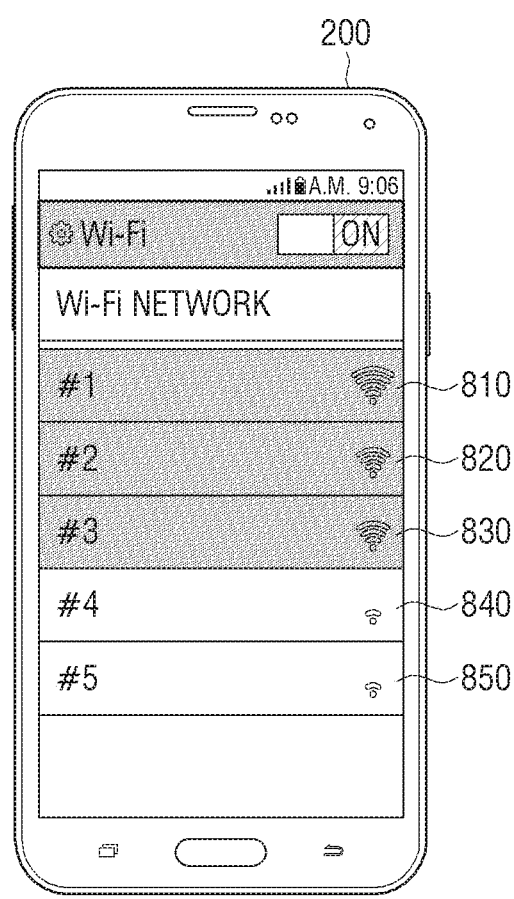

In addition, as illustrated in FIG. 8, in a case in which the APs corresponding to the optimum AP and the APs that do not correspond to the optimum AP are simultaneously displayed, the controller 330 may control the display 320 to display the APs corresponding to the optimum AP in a method different from the APs that do not correspond to the optimum AP. In FIG. 8, the APs corresponding to the optimum AP are displayed a darker color than the APs that do not correspond to the optimum AP, but this is merely an example, and it is possible to display that the APs correspond to the optimum AP by various methods such as a highlight indication, attaching an icon or a text to ID of the APs corresponding to the optimum AP, and the like.

In addition, in a case in which the optimum AP is one, the controller 330 may control the communicator 310 to perform a wireless communication connection between one optimum AP and the user terminal.

Figure 9:
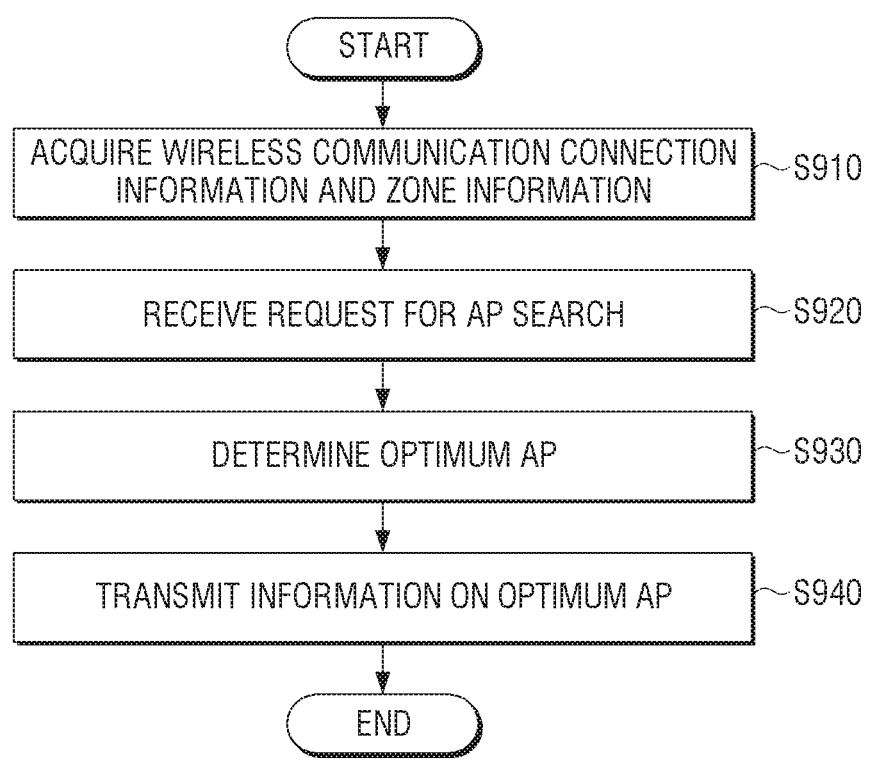
FIGS. 9 and 10 are flowcharts illustrating a control method of a server according to various exemplary embodiments of the present disclosure.

A control method of a sever 100 according to an exemplary embodiment of the present disclosure will be described with reference to FIG. 9.

First, the server 100 may acquire wireless communication connection information and zone information from one or more user terminals (S910).

In addition, when a request for an optimum AP search is received from a first user terminal 200-1 (S920), the server 100 may determine an optimum AP (S930). Specifically, the server 100 may determine at least one optimum AP which may be connected with the first user terminal 200-1 based on the acquired wireless communication connection information and zone information of the user terminals.

In addition, the server 100 may transmit the determined optimum AP to the first user terminal 200-1.

Figure 10:
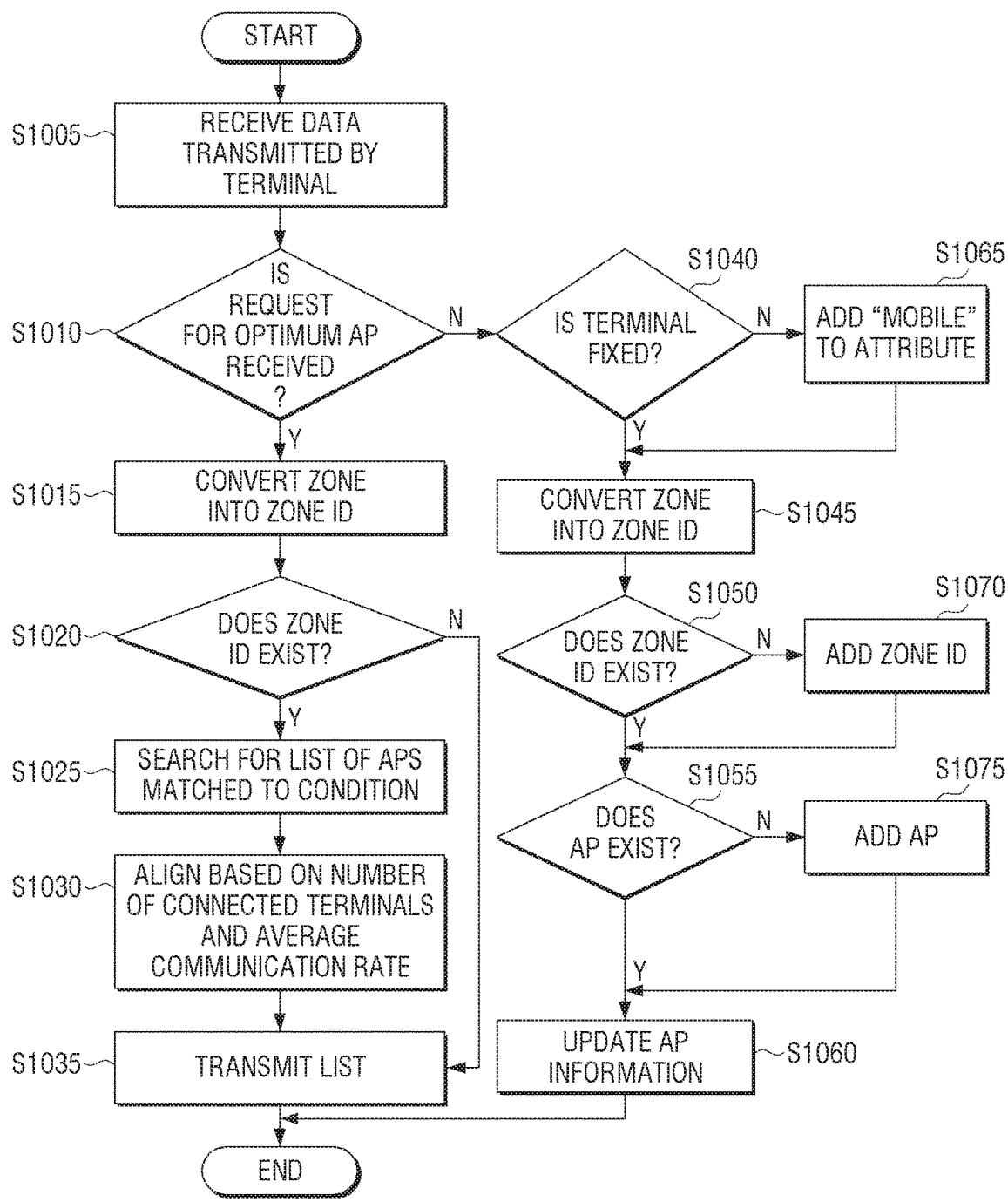

A control method of a sever 100 according to another exemplary embodiment of the present disclosure will be described in detail with reference to FIG. 10.

First, when a request for an optimum AP search is received from the user terminal 200 (S1010), the server 100 may convert a zone of the user terminal 200 into ZONE ID (S1015). If the ZONE ID at which the user terminal 200 is located is stored ZONE ID, the server 100 may search for APs included in the ZONE ID (S1025). In this case, the server 100 may align the APs based on the number of connected terminals, an average communication rate, and the like (S1030) and transmit information on an optimum AP (S1035).

In addition, when the request for the optimum AP search is not received from the user terminal 200, the server 100 may acquire the wireless communication connection information and the zone information from the user terminal 200. By acquiring the zone information, the server 100 may determine whether or not the user terminal 200 is fixed (S1040). If the user terminal 200 is not fixed, the server 100 may store an AP which is wireless communication connected with the user terminal 200 as a mobile AP (S1065). The server 100 may convert the zone of the user terminal when acquiring the wireless communication connection information and the zone information from the user terminal 200 into ZONE ID (S1045). In a case in which the ZONE exists, the server 100 may determine whether or not the AP exists (S1055), and in a case in which the ZONE ID does not exist, the server 100 may store the ZONE ID (S1070), and then determine whether or not the AP exists (S1055). In a case in which the AP exists, the server 100 may update AP information (S1060), and in a case in which the AP does not exist, the server 100 may add the AP (S1075) and then update the AP information (S1060).

Figure 11:
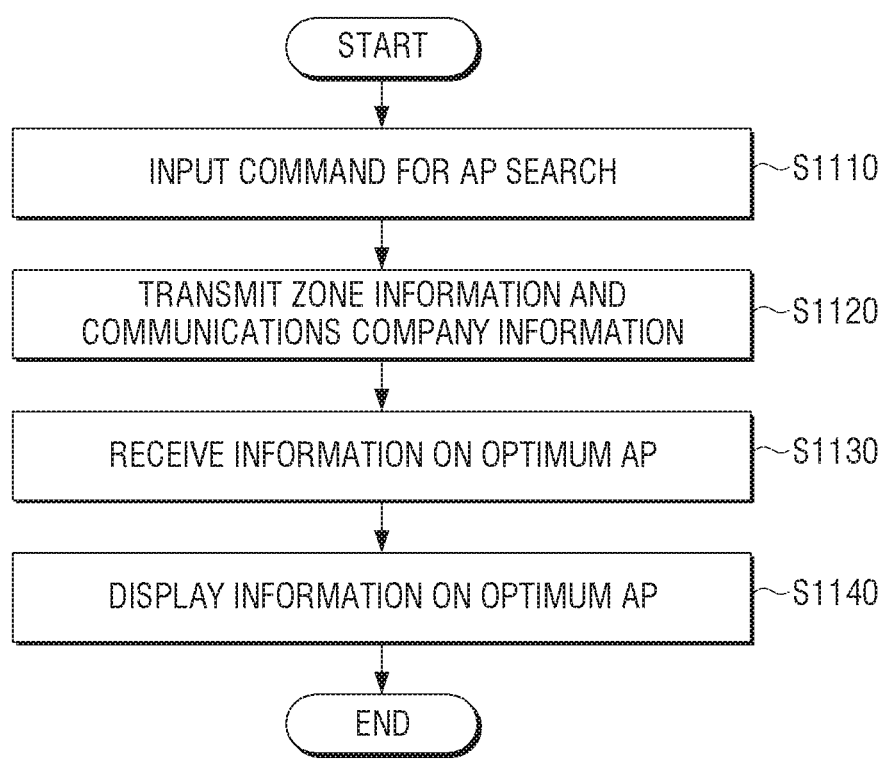
FIG. 11 is a flowchart illustrating a control method of a user terminal according to an exemplary embodiment of the present disclosure.

A control method of a sever 100 according to an exemplary embodiment of the present disclosure will be described with reference to FIG. 11.

First, the user terminal 200 may input a user command for an AP search (S1110).

In addition, the user terminal 200 may transmit zone information and communications company information of the user terminal 200 to the server (S1120).

In addition, the user terminal 200 may receive information on an optimum AP determined based on the zone information and the communications company information from the server (S1130).

In addition, the user terminal 200 may display the received information on the optimum AP (S1140).

Figure 12:
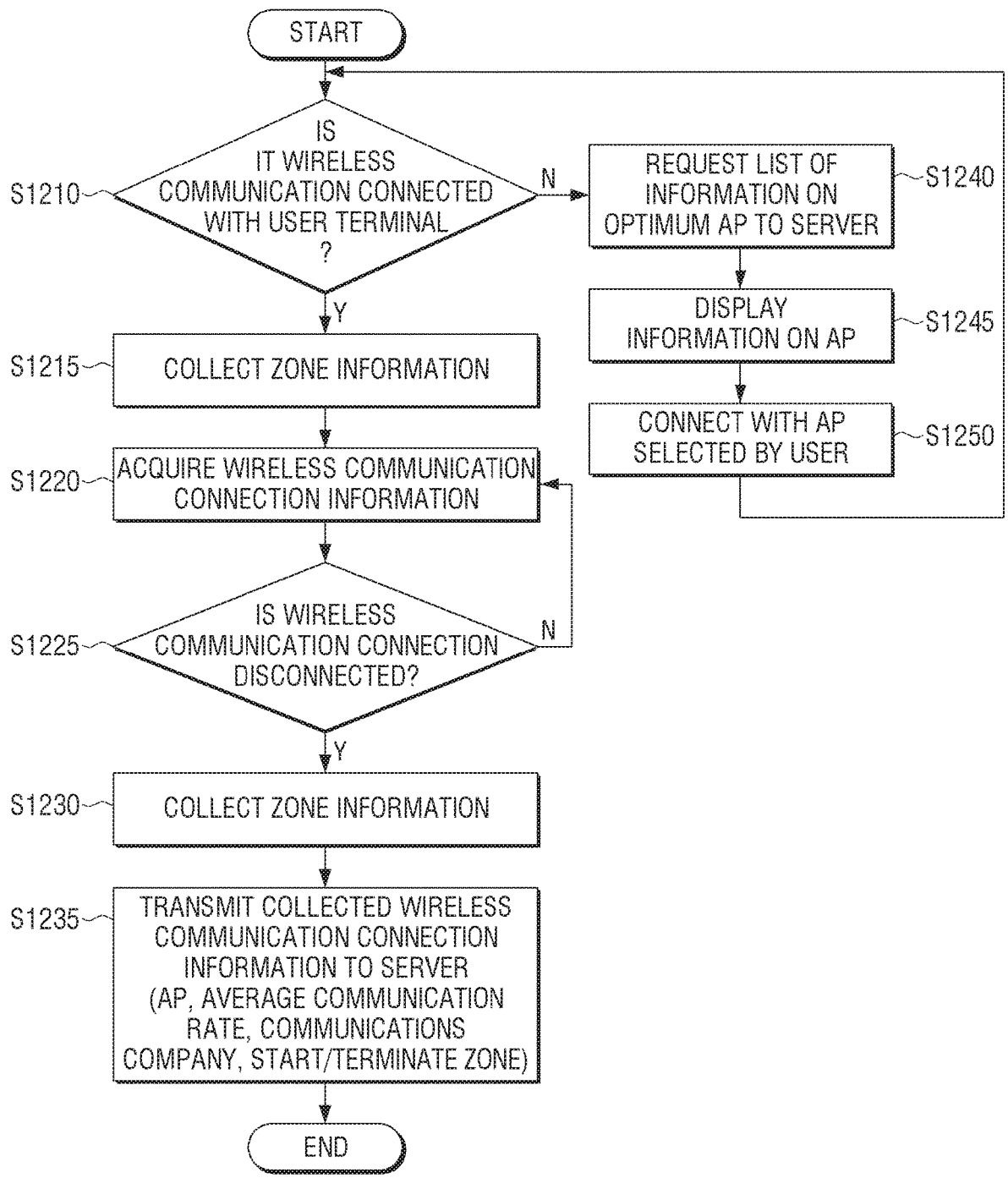
FIG. 12 is a flowchart illustrating a control method of a system according to an exemplary embodiment of the present disclosure.

A control method of a system according to an exemplary embodiment of the present disclosure will be described with reference to FIG. 12.

First, the server 100 may determine whether or not it may be wireless communication connected with the user terminal 200 (S1210).

In addition, if the server 100 is wireless communication connected with the user terminal 200, the server 100 may acquire zone information (S1215) of the user terminal 200 and wireless communication connection information (S1220) of the user terminal 200. Here, the zone information may be a wireless communication connection start zone, and the wireless communication connection information may be communications company information, information on the AP connected with the user terminal 200, an average communication rate of the user terminal and the AP.

In addition, the server 100 may determine whether or not the wireless communication connection is disconnected (S1225). If the wireless communication connection is not disconnected, the server 100 may acquire the wireless communication connection information. That is, the server 100 may acquire the wireless communication connection information according to a predetermined period, or may acquire the wireless communication connection information aperiodically (e.g., when the user command is input). If the wireless communication connection is disconnected, the server 100 may collect the zone information of the user terminal 200 (S1230). This may be used as a zone when the wireless communication connection is terminated. When ZONE IDs corresponding to each of a wireless communication connection start zone and a wireless communication connection terminate zone of a specific AP are different from each other, the server 100 may determine the specific AP as a mobile AP.

In addition, when the user terminal 200 which is not wireless communication connected receives the user command for the AP search, the user terminal 200 may request the information on the optimum AP to the server 100 (S1240).

In addition, the user terminal 200 may receive the information on the optimum AP from the server. The user terminal 200 may display the received information on the optimum AP (S1245). In this case, the information on the optimum AP may include at least one AP, and when there are a plurality of optimum APs, the user terminal 200 may be connected with an AP corresponding to a user command input (S1250).

Figure 13:
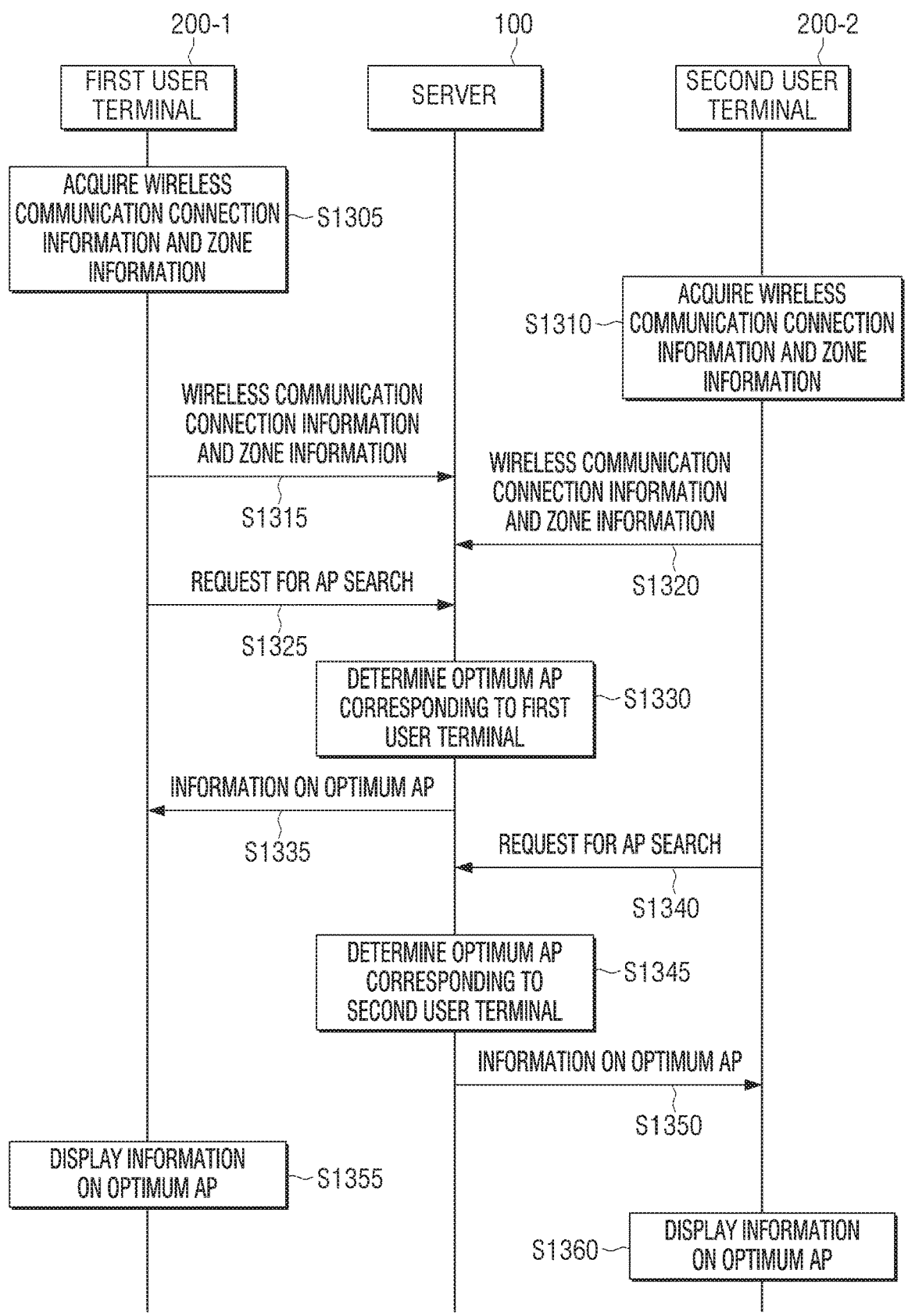
FIG. 13 is a sequence diagram illustrating the control method of a system according to an exemplary embodiment of the present disclosure.

FIG. 13 is a sequence diagram illustrating a control method of a system for providing information on an optimum AP according to an exemplary embodiment of the present disclosure.

First, the first user terminal 200-1 and the second user terminal 200-2 may acquire wireless communication connection information and zone information (S1305, S1310).

In addition, the server 100 may receive the wireless communication connection information and zone information of the first user terminal from the first user terminal 200-1 (S1315), and may receive the wireless communication connection information and zone information of the second user terminal from the second user terminal 200-2 (S1320). The server 100 may receive the wireless communication connection information and the zone information at a predetermined period from the user terminal, or may receive the wireless communication connection information and the zone information when the user command is input.

In addition, when a request for an optimum AP search is received from the first user terminal 200-1 (S1325), the server 100 may determine an optimum AP corresponding to the first user terminal 200-1 (S1330). The server 100 may transmit information on the determined optimum AP to the first user terminal 200-1 (S1335).

In addition, when the information on the optimum AP is received, the first user terminal 200-1 may display the information on the optimum AP (S1355).

Similarly, when the request for the optimum AP search is received from the second user terminal 200-2 (S1340), the server 100 may determine an optimum AP corresponding to the second user terminal 200-2 (S1345). The server 100 may transmit information on the determined optimum AP to the second user terminal 200-2 (S1350).

In addition, when the information on the optimum AP is received, the second user terminal 200-2 may display the information on the optimum AP (S1355).

It will be understood by those skilled in the art to which the present disclosure pertains that the present disclosure may be implemented in a modified form without departing from essential characteristics of the present disclosure. Therefore, the disclosed methods should be considered in an illustrative aspect rather than a restrictive aspect. The scope of the present disclosure should be defined by the following claims rather than the above-mentioned description, and all technical spirits equivalent to the following claims should be interpreted as being included in the present disclosure.

The invention claimed is:

1. A control method of a server providing information on an optimum access point (AP), the control method comprising:
   receiving, from a plurality of user terminals, wireless communication connection information of the plurality of user terminals and zone information of the plurality of user terminals from each of the plurality of user terminals, the wireless communication connection information including communications company information regarding a service provider for a wireless connection of each of the plurality of user terminals, the zone information regarding a plurality of zones where the plurality of user terminals are located;
   storing the received wireless communication connection information and the received zone information;
   in response to a request for information regarding at least one optimum AP being received from a first user terminal of the plurality of user terminals, identifying a zone of the first user terminal among the plurality of zones based on the stored zone information and zone identification of a specific zone of the plurality of zones, and identifying the at least one optimum AP among a plurality of APs corresponding to the identified zone of the first user terminal based on the stored wireless communication connection information, wherein the at least one optimum AP is to be connected with the first user terminal; and
   transmitting information regarding the identified at least one optimum AP to the first user terminal,
   wherein the wireless communication connection information includes at least one of information on the AP connected with the plurality of user terminals, or an average communication rate with the connected AP, and
   wherein the zone information of the plurality of user terminals includes a wireless communication connection start zone and a wireless communication connection terminate zone.

2. The control method as claimed in claim 1, further comprising:
   storing at least one AP which is present at the specific zone, and information on a communications company connected with the at least one AP, an average communication rate of the at least one AP, and whether or not the at least one AP is moved, based on the wireless communication connection information and the zone information of the plurality of user terminals.

3. The control method as claimed in claim 2, wherein in the identifying of the at least one optimum AP, when the request for the AP search is received from the first user terminal which is present at the specific zone, the at least one optimum AP is determined by comparing information on a communications company of the first user terminal with information on a communications company connected with the at least one AP which is present at the specific zone.

4. The control method as claimed in claim 2, wherein in the identifying of the at least one optimum AP, when the request for the AP search is received from the first user terminal which is present at the specific zone, an AP having the average communication rate of a predetermined value or more is determined as the at least one optimum AP.

5. The control method as claimed in claim 2, wherein in the identifying of the at least one optimum AP, based on that the wireless communication connection start zone and the wireless communication connection terminate zone being different from each other and the request for the AP search being received from the first user terminal which is present at the specific zone, the at least one optimum AP is determined based on whether the at least one AP, which is present at the specific zone, is moved.

6. The control method as claimed in claim 1, wherein in the receiving of the wireless communication connection information and the zone information, the wireless communication connection information and the zone information of the plurality of user terminals are acquired at a predetermined period, or the wireless communication connection information and the zone information of the plurality of user terminals are acquired according to a user command.

7. A server providing information on an optimum access point (AP), the server comprising:
   a communicator configured to communicate with a user terminal;
   a memory; and
   a controller configured to control the communicator to:
   receive, from a plurality of user terminals, wireless communication connection information of the plurality of user terminals and zone information of the plurality of user terminals from each of the plurality of user terminals, the wireless communication connection information including communications company information regarding a service provider for a wireless connection of each of the plurality of user terminals, the zone information regarding a plurality of zones where the plurality of user terminals are located,
   store, in the memory, the received wireless communication connection information and the received zone information,
   in response to a request for information regarding at least one optimum AP being received from a first user terminal of the plurality of user terminals, identify a zone of the first user terminal among the plurality of zones based on the stored zone information and zone identification of a specific zone of the plurality of zones, and identifying the at least one optimum AP among a plurality of APs corresponding to the identified zone of the first user terminal based on the stored wireless communication connection information, wherein the at least one optimum AP is to be connected with the first user terminal, and
   transmit information regarding the identified at least one optimum AP to the first user terminal,
   wherein the wireless communication connection information includes at least one of information on a communications company, information on the AP connected with the plurality of user terminals, or an average communication rate with the connected AP, and
   wherein the zone information of the plurality of user terminals includes a wireless communication connection start zone and a wireless communication connection terminate zone.

8. The server as claimed in claim 7, wherein the memory configured to store at least one AP which is present at the specific zone, and information on a communications company connected with the at least one AP, an average communication rate of the at least one AP, and whether or not the at least one AP is moved, based on the wireless communication connection information and the zone information of the plurality of user terminals.

9. The server as claimed in claim 8, wherein when the request for the AP search is received from the first user terminal which is present at the specific zone, the controller determines the at least one optimum AP by comparing information on a communications company of the first user terminal with information on a communications company connected with the at least one AP which is present at the specific zone.

10. The server as claimed in claim 8, wherein when the request for the AP search is received from the first user terminal which is present at the specific zone, the controller determines an AP having the average communication rate of a predetermined value or more as the at least one optimum AP.

11. The server as claimed in claim 8, wherein based on that the wireless communication connection start zone and the wireless communication connection terminate zone being different from each other, and the request for the AP search being received from the first user terminal which is present at the specific zone, the controller determines the at least one optimum AP based on whether the at least one AP, which is present at the specific zone, is moved.

12. The server as claimed in claim 7, wherein the controller controls the communicator to acquire the wireless communication connection information and the zone information of the plurality of user terminals at a predetermined period, or to acquire the wireless communication connection information and the zone information of the plurality of user terminals according to a user command.

* * * * *